United States Patent
Kim et al.

(10) Patent No.: US 9,978,119 B2
(45) Date of Patent: May 22, 2018

(54) METHOD FOR AUTOMATIC FACIAL IMPRESSION TRANSFORMATION, RECORDING MEDIUM AND DEVICE FOR PERFORMING THE METHOD

(71) Applicant: Korea Institute of Science and Technology, Seoul (KR)

(72) Inventors: Ig Jae Kim, Seoul (KR); Heeseung Choi, Seoul (KR); Sungyeon Park, Seoul (KR); Junghyun Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 134 days.

(21) Appl. No.: 15/069,095

(22) Filed: Mar. 14, 2016

(65) Prior Publication Data
US 2017/0116705 A1    Apr. 27, 2017

(30) Foreign Application Priority Data
Oct. 22, 2015 (KR) .......................... 10-2015-0147405

(51) Int. Cl.
*G06T 3/00* (2006.01)
*G06K 9/00* (2006.01)
(Continued)

(52) U.S. Cl.
CPC ........ *G06T 3/0093* (2013.01); *G06K 9/00281* (2013.01); *G06K 9/00302* (2013.01); *G06T 11/00* (2013.01); *G06T 15/00* (2013.01)

(58) Field of Classification Search
CPC ............ G06K 9/00281; G06K 9/00302; G06T 15/00; G06T 11/00; G06T 3/0093
See application file for complete search history.

(56) References Cited

U.S. PATENT DOCUMENTS

| 9,104,908 B1* | 8/2015 | Rogers | ............... G06K 9/00315 |
| 2002/0057273 A1* | 5/2002 | Iwata | ...................... G06T 13/40 345/473 |

(Continued)

FOREIGN PATENT DOCUMENTS

| KR | 10-0764130 B1 | 10/2007 |
| KR | 10-1444816 B1 | 9/2014 |
| KR | 10-1484003 B1 | 1/2015 |

OTHER PUBLICATIONS

Leyvand, Tommer, et al. "Data-driven enhancement of facial attractiveness." ACM Transactions on Graphics (2008) (9 pages in English).

*Primary Examiner* — Michelle L Sams
(74) *Attorney, Agent, or Firm* — NSIP Law (57) ABSTRACT

A method for automatic facial impression transformation includes extracting landmark points for elements of a target face whose facial impression is to be transformed as well as distance vectors respectively representing distances of the landmark points, comparing the distance vectors to select a learning data set similar to the target face from a database, extracting landmark points and distance vectors from the learning data set, transforming a local feature of the target face based on the landmark points of the learning data set and score data for a facial impression, and transforming a global feature of the target face based on the distance vectors of the learning data set and the score data for the facial impression. Accordingly, a facial impression may be transformed in various ways while keeping an identity of a corresponding person.

19 Claims, 6 Drawing Sheets

(51) Int. Cl.
*G06T 15/00* (2011.01)
*G06T 11/00* (2006.01)

(56) References Cited

U.S. PATENT DOCUMENTS

2012/0139830 A1* 6/2012 Hwang .................. G06F 3/012
345/156
2015/0046375 A1* 2/2015 Mandel .................. G06T 13/80
706/11

* cited by examiner

<LOCAL FEATURE TRANSFORMATION>

BEFORE​ ​ ​ ​ ​ ​ ​ ​ AFTER
TRANSFORMATION​ ​ TRANSFORMATION

FIG. 4

<GLOBAL FEATURE TRANSFORMATION>

BEFORE​ ​ ​ ​ ​ ​ ​ ​ AFTER
TRANSFORMATION​ ​ TRANSFORMATION

METHOD FOR AUTOMATIC FACIAL IMPRESSION TRANSFORMATION, RECORDING MEDIUM AND DEVICE FOR PERFORMING THE METHOD

CROSS-REFERENCE TO RELATED APPLICATION

This application claims priority to Korean Patent Application No. 10-2015-0147405, filed on Oct. 22, 2015, and all the benefits accruing therefrom under 35 U.S.C. § 119, the contents of which in its entirety are herein incorporated by reference.

BACKGROUND

1. Field

The present disclosure relates to a method for automatic facial impression transformation, and a recording medium and device for performing the method, and more particularly, to a method for automatic facial impression transformation, which changes a target face model into a desired facial impression for the purpose of a video conference, a recording medium and device for performing the method.

2. Description of the Related Art

Along with the development of technologies, many persons are capable of communicating with other persons anytime and at any place by using digital instruments such as smart phones. By using a video conference technique of digital instruments, persons are able to communicate with each other while looking in the face as if facing each other even though they are far away from each other.

During a video conference, a person will want to show a certain facial impression to opponents. In addition, at a situation such as an interview for a job, a person would like to show a more reliable image. In this case, a technique for changing a facial image into a facial impression desired by a user to hold a video conference with the desired facial impression is demanded.

However, in an existing facial impression transforming method, an input facial image is transformed into a facial impression using an engine learned with the same data, and thus all faces tend to change into a similar way (for example, enlarging the size of eyes). In addition, the existing technique is not capable of classifying facial images into several classes in advance, selecting a class similar to an input facial image to configure a learning data set, and then configuring a customized learning data set for the input facial image.

SUMMARY

The present disclosure is directed to providing a method for automatic facial impression transformation, which may change a target face model into a desired facial impression.

The present disclosure is also directed to providing a recording medium on which a computer program for performing the method for automatic facial impression transformation is recorded.

The present disclosure is also directed to providing a device for performing the method for automatic facial impression transformation.

In one aspect, there is provided a method for automatic facial impression transformation, comprising: extracting landmark points for elements of a target face whose facial impression is to be transformed as well as distance vectors respectively representing distances of the landmark points; comparing the distance vectors to select a learning data set similar to the target face from a database; extracting landmark points and distance vectors from the learning data set; transforming a local feature of the target face based on the landmark points of the learning data set and score data for a facial impression; and transforming a global feature of the target face based on the distance vectors of the learning data set and the score data for the facial impression.

In an embodiment of the present disclosure, in the comparing of the distance vectors to select a learning data set similar to the target face from a database, an n (here, n is a natural number) number of learning data set may be selected in order from a learning data most similar to the target face.

In an embodiment of the present disclosure, the transforming of a local feature of the target face based on the landmark points of the learning data set may include: generating a target function based on the landmark points of the learning data set and score data of a facial impression; and determining shapes and sizes of the elements of the target face based on the target function.

In an embodiment of the present disclosure, the transforming of a global feature of the target face based on the distance vectors of the learning data set may include: generating a target function based on the distance vectors of the learning data set and score data of a facial impression; and determining locations and angles of the elements of the target face based on the target function.

In an embodiment of the present disclosure, the determining of locations and angles of the elements of the target face based on the target function may include: extracting a modified distance vector based on the target function; extracting a modified distance vector for a specific facial impression by means of an optimization technique; extracting a modified distance vector by setting a distance vector of the target face as an initial value at the target function; modifying landmark points to decrease an error of distance between the modified distance vector and the landmark points corresponding to the modified distance vector; and moving locations of the face elements transformed based on the modified landmark points.

In an embodiment of the present disclosure, the method for automatic facial impression transformation may further include outputting an image transformed in real time with respect to a moving target face.

In an embodiment of the present disclosure, the outputting of an image transformed in real time with respect to a moving target face may include: arranging angles and locations of the landmark points of the transformed target face to landmark points of an initial face before transformation; extracting landmark points of the face in real time for each frame with respect to a moving facial image; extracting an angle difference between the landmark points extracted in real time and the landmark points of the initial face; adding the angle difference to the landmark points of the transformed target face; and warping the target face based on the landmark points modified in real time and outputting the warped face.

In an embodiment of the present disclosure, the method for automatic facial impression transformation may further include acquiring a target face whose facial impression is to be transformed.

In an embodiment of the present disclosure, the target face may be an expressionless photograph staring at front.

In an embodiment of the present disclosure, the method for automatic facial impression transformation may further include forming a database storing learning data.

In an embodiment of the present disclosure, the forming of a database storing learning data may include: acquiring expressionless front facial images; and extracting landmark points and distance vectors from the expressionless front facial images.

In an embodiment of the present disclosure, the forming of a database storing learning data may include: collecting and accumulating score data for facial impressions.

In another aspect of the present disclosure, there is provided a computer-readable recording medium, on which a computer program for executing the method for automatic facial impression transformation is recorded.

In another aspect of the present disclosure, there is provided a device for automatic facial impression transformation, comprising: a facial feature extracting unit configured to extract landmark points for elements of a target face whose facial impression is to be transformed as well as distance vectors respectively representing distances of the landmark points; a facial impression transforming unit configured to compare the distance vectors, select an n (here, n is a natural number) number of learning data set in order from a learning data most similar to the target face, extract landmark points and distance vectors from the learning data set, and transform a facial impression of the target face based on the extracted landmark points and distance vectors of the learning data set; and a moving picture tracing unit configured to output a transformed image in real time with respect to a moving target face.

In an embodiment of the present disclosure, the facial impression transforming unit may include a local feature transforming unit configured to generate a target function based on the landmark points of the learning data set and score data of a facial impression and determine shapes and sizes of the elements of the target face based on the target function.

In an embodiment of the present disclosure, the facial impression transforming unit may include a global feature transforming unit configured to generate a target function based on the distance vectors of the learning data set and score data of a facial impression and determine locations and angles of the elements of the target face based on the target function.

In an embodiment of the present disclosure, the device for automatic facial impression transformation may further include an image acquiring unit configured to acquire a target face whose facial impression is to be transformed.

In an embodiment of the present disclosure, the device for automatic facial impression transformation may further include a database constructing unit configured to store expressionless front facial images as well as landmark points and distance vectors extracted from the expressionless front facial images.

The present disclosure is directed to a method for automatic facial impression transformation based on a moving picture, and when a facial impression is transformed, a learning data set is configured suitable for a facial shape of an input target face to generate an estimation function of the corresponding facial impression, so that face components (shape and location) are transformed to have a high resultant value of the function, thereby transforming the facial image into a facial impression desired by the user. Therefore, the transformation efficiency may be maximized.

In addition, the transformation process is performed at two stages, namely a local transformation for determining size and shape of local elements (eyes, eyebrows, nose and mouth) of the face and a global transformation for determining locations of local elements of the face, thereby enhancing the accuracy. Further, it is possible to detect a facial landmark point in real time and consider a movement of an object, which allows application to a moving picture.

DETAILED DESCRIPTION

The following detailed description of the present disclosure refers to the accompanying drawings which show specific embodiments implemented by the present disclosure. These embodiments are described in detail so as to be easily implemented by those skilled in the art. It should be understood that various embodiments of the present disclosure are different from each other but not exclusive from each other. For example, specific shapes, structures and features written herein can be implemented in other embodiments without departing from the scope of the present disclosure. In addition, it should be understood that locations or arrangements of individual components in each embodiment may be changed without departing from the scope of the present disclosure. Therefore, the following detailed description is not directed to limiting the present disclosure, and the scope of the present disclosure is defined just with the appended claims along and their equivalents, if it is suitably explained. In the drawings, like reference numerals denote like elements through several drawings.

Hereinafter, embodiments of the present disclosure will be described in detail with reference to the accompanying drawings.

Figure 1:
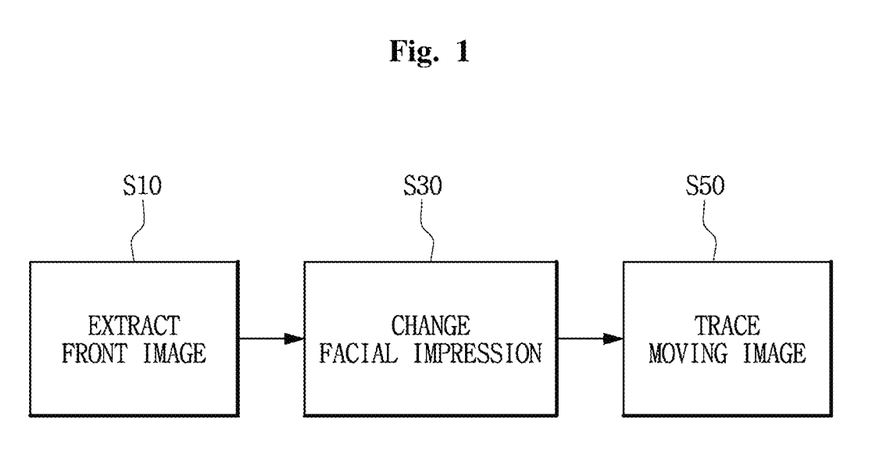
FIG. 1 is a flowchart for illustrating a method for automatic facial impression transformation according to an embodiment of the present disclosure.
Figure 2:
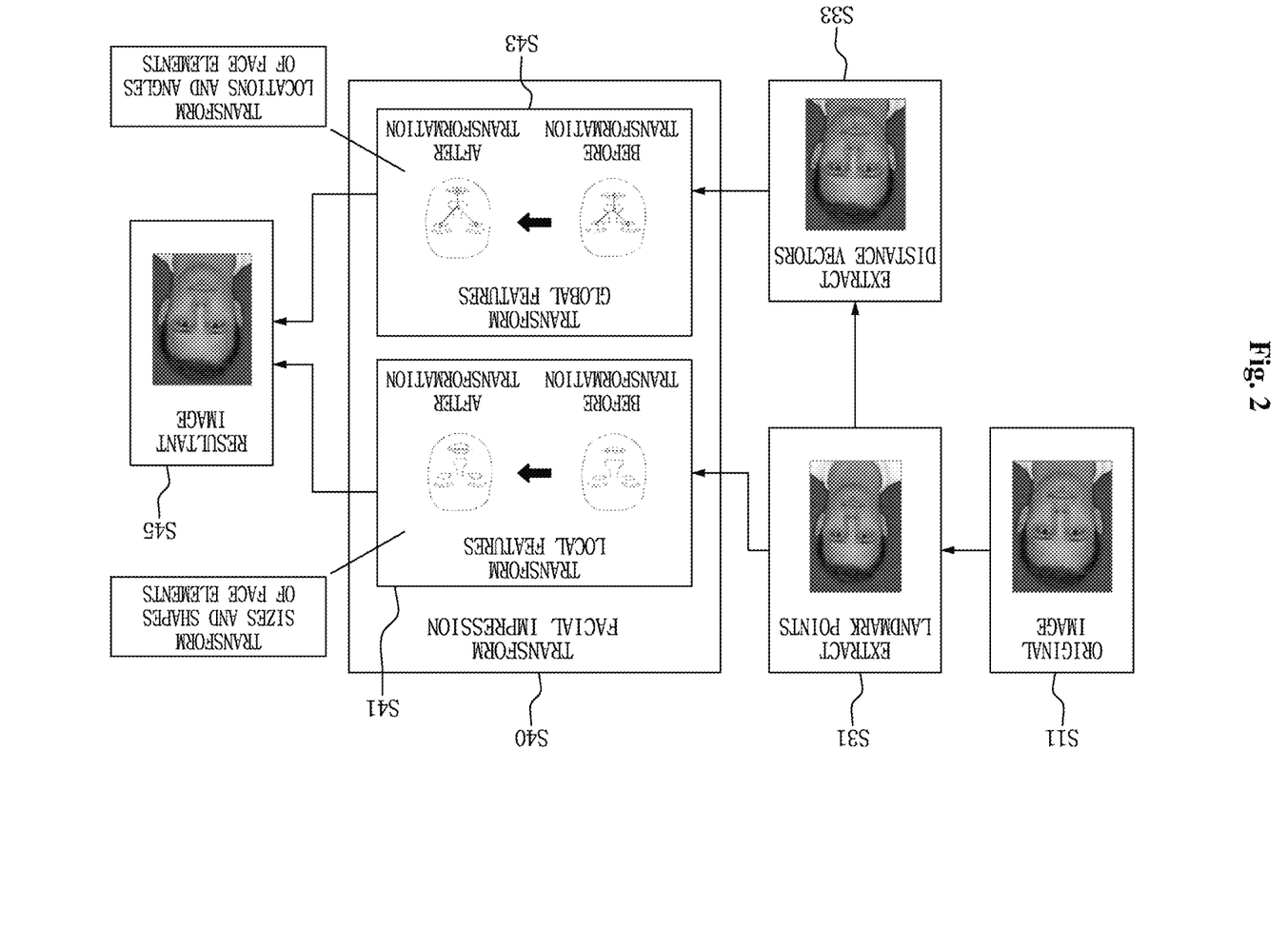
FIG. 2 is a diagram showing the flow of the method for automatic facial impression transformation, depicted in FIG. 1.

FIG. 1 is a flowchart for illustrating a method for automatic facial impression transformation according to an embodiment of the present disclosure. FIG. 2 is a diagram showing the flow of the method for automatic facial impression transformation, depicted in FIG. 1.

The present disclosure is directed to a method for automatic facial impression transformation based on a moving picture, and when a facial impression is transformed, a learning data set is configured suitable for a facial shape of an input target face to generate an estimation function of the corresponding facial impression, so that face components (shape and location) are transformed to have a high resultant value of the function, thereby transforming the facial image into a facial impression desired by the user.

In addition, the transformation process is performed at two stages, namely a local transformation for determining size and shape of local elements (eyes, eyebrows, nose and mouth) of the face and a global transformation for determining locations of local elements of the face. Further, it is possible to detect a facial landmark point in real time and consider a movement of an object, which allows application to a moving picture.

Referring to FIG. 1, the present disclosure provides a method for extracting a front image (S10), automatically changing a target face model into a desired facial impression by using data (S30), and then replacing the target face with a transformed face in real time in a moving picture (S50).

Though not shown in FIG. 1, the method for automatic facial impression transformation according to the present disclosure may have a learning process for facial impression transformation.

For learning, first, expressionless front image data are acquired, and then each data is evaluated into scores (for example, 1 to 7 points) depending on the degree of facial impression to be transformed. In an embodiment, a user may input a score for a facial impression, for example "baby-faced", "matured", "sharp", "gentle" or the like, and the score of the facial impression may be automatically calculated according to the input score.

In addition, from the expressionless front image data, a mesh where landmark points for face elements (eyebrows, eyes, nose and mouth) and landmark points selected by means of Delaunay triangulation are connected is generated, and distance vectors respectively representing distances of the landmark points are respectively extracted therefrom.

The landmark point means a distinctive portion of face elements (eyebrows, eyes, nose and mouth). The landmark point is extracted based on a contour of a facial appearance, a boundary of color, a curve point, a difference in brightness or the like, and thus generally a plurality of landmark points is extracted. For example, about 75 to 85 landmark points may be extracted.

The distance vector means a vector connecting two adjacent landmark points and gives intuitive information about a face structure. Since a plurality of landmark points is provided, a plurality of distance vectors is also configured. Therefore, the distance vectors are defined with a plurality of dimensions.

For example, when an m number of vectors are defined from a $V_1$ vector to a $V_m$ vector, a distance vector becomes an m-dimension vector. The distance vector may be measured in various ways like Euclidean distance, Mahalanobis distance or the like.

The face image is normalized according to a square root of each face size, and then the face image is stored in a database together with information about landmark points and distance vectors of each face image and the score of the facial impression.

After that, the facial impression transformation process (S30) is performed.

Referring to FIG. 2, first, a target face whose facial impression is to be transformed is prepared (S11). The target face is obtained in real time from a camera, and an expressionless staring at front may be selected.

In addition, from the target face, landmark points for elements and distance vectors respectively representing distances of the landmark points are extracted (S31 and S33).

Based on the distance vectors of the target face, a learning data set similar to the target face is extracted from the database. The learning data set is composed of data having small distance vectors based on the input face.

In detail, in the present disclosure, in order to select learning data suitable for the target face, distances of all data stored in the database are compared, and then an n (here, n is a natural number) number of images having small distances from the target face are selected and used as the learning data. In other words, an n number of learning data is selected in order from a data most similar to the target face, instead of using a predetermined data set, and thus a result with high accuracy is expected.

In addition, the facial impression transformation (S40) of the present disclosure is performed separately into local transformation (S41) for determining shapes and sizes of elements of the face and global transformation (S43) for determining locations of the elements of the face.

In the local transformation (S41) of the face, a target function is generated based on the landmark points for the face elements (eyebrows, eyes, nose and mouth) of the n number of selected learning data and scores of a facial impression. At this time, in order to reduce an amount of calculation, the dimension of vectors composed of landmark points may be decreased by means of principal component analysis (PCA).

Figure 3:
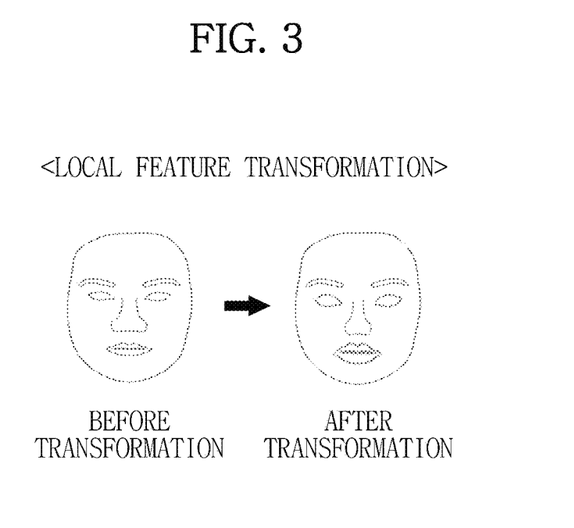
FIG. 3 is a diagram showing a local feature transformation, during a facial impression transforming process.

In addition, a log-likelihood term may be added to the generated target function so that the search region may be limited to the form of effective face elements by means of Gaussian distribution. Subsequently, shapes and sizes of face elements are determined by means of an optimization technique (see FIG. 3).

In the global transformation (S43) of the face, a target function is generated based on the distance vectors for global face features of the n number of selected learning data and scores of a facial impression.

A modified distance vector may be found by using the generated target function. Also, in order to reduce an amount of calculation, the dimension of distance vectors may be decreased by means of principal component analysis (PCA).

In addition, so that the result value of the optimization may be suitable for a face region, a log-likelihood term may be added to limit the search region to a face region. The log-likelihood term models a face region by using multi-variable Gaussian distribution.

Moreover, a modified distance vector for a specific facial impression may be found by means of an optimization technique. The modified distance vector is found after setting the distance vector of the target face model based on the generated target function as an initial point. As in Mathematic Formula 1 below, the modified distance vector ($f(x^\sim)$) should be close to the distance vector ($f(x)$) of the target face model and also have a higher value for the facial impression.

$$f(x^\sim) > f(x) \qquad \text{Mathematic Formula 1}$$

Figure 4:
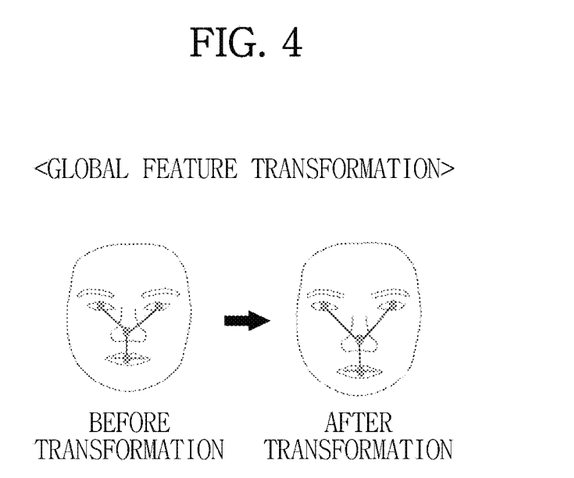
FIG. 4 is a diagram showing a global feature transformation, during a facial impression transforming process.

The landmark points are corrected to decrease an error in distance between the modified distance vector and the landmark points corresponding thereto. Based on the obtained result value, the location of each landmark point of the transformed face element is changed according to the result of the global transformation (see FIG. 4).

The facial impression transformation of the present disclosure may output a resultant image with a maximized transformation effect by using two stages of local transformation and global transformation (S45). Meanwhile, two stages may also be modified individually, and it is also possible to acquire a resultant image where a facial impression is transformed in consideration of only global features or a resultant image where a facial impression is transformed in consideration of only local features.

In addition, in the present disclosure, facial impression transformation may be performed for various facial impressions based on learning, and the image with a transformed facial impression may be utilized to treat not only a still image but also a moving image.

As a moving image tracing process (S50), angles and locations of the landmark points of the resultant image of the facial impression transformation process (S30), namely the finally transformed face, are arranged to landmark points of the initial face before transformation.

For a moving facial image, landmark points of the face are extracted in real time for each frame by means of a facial feature extracting technique. Subsequently, a difference value between the landmark points of the face extracted in real time and the landmark points of the initial face before transformation is obtained, and then the obtained value is added to the landmark points of the transformed face in real time.

An actual texture image of each frame input by a camera is warped based on the landmark points changing in real time and then output.

Figure 5A:
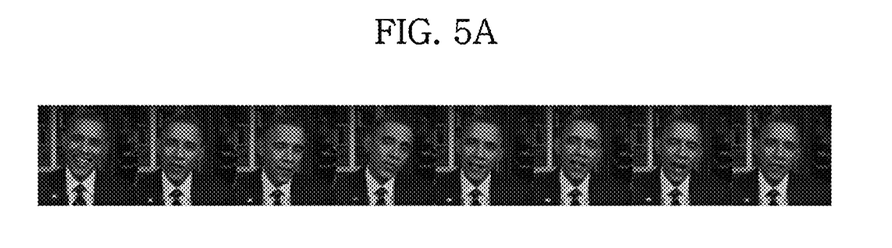
FIGS. 5A to 5C are diagrams exemplarily showing a moving picture with a transformed facial impression according to the present disclosure.
Figure 5B:
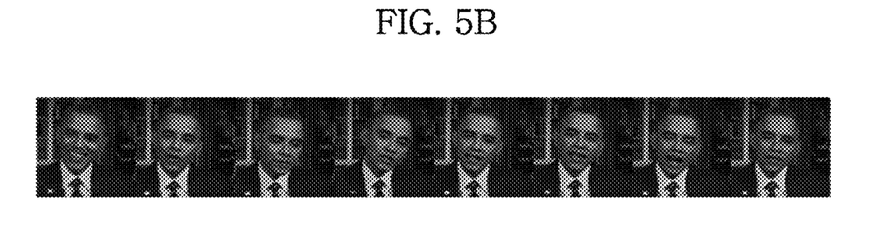
Figure 5C:
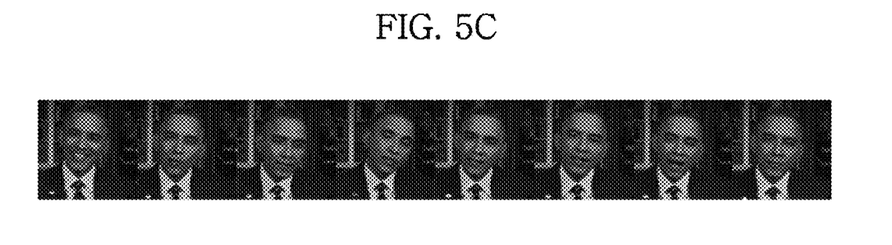

FIGS. 5A to 5C are diagrams exemplarily showing a moving picture with a transformed facial impression according to the present disclosure, where FIG. 5A is an original moving picture of Barack Obama, the President of the USA, FIG. 5B shows an example of a facial impression transformed into a baby face, and FIG. 5C shows an image where the facial impression is transformed into a wild shape.

The method for automatic facial impression transformation as described above may be implemented as an application or program commands executable by various kinds of computer means and recorded on a computer-readable recording medium. The computer-readable recording medium may include program commands, data files, data structures or the like solely or in combination.

The program commands recorded on the medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a complier but also high-level language codes executable by a computer by using an interpreter. The hardware device may be configured to operate as at least one software module to perform the operations of the present disclosure, or vice versa.

Figure 6:
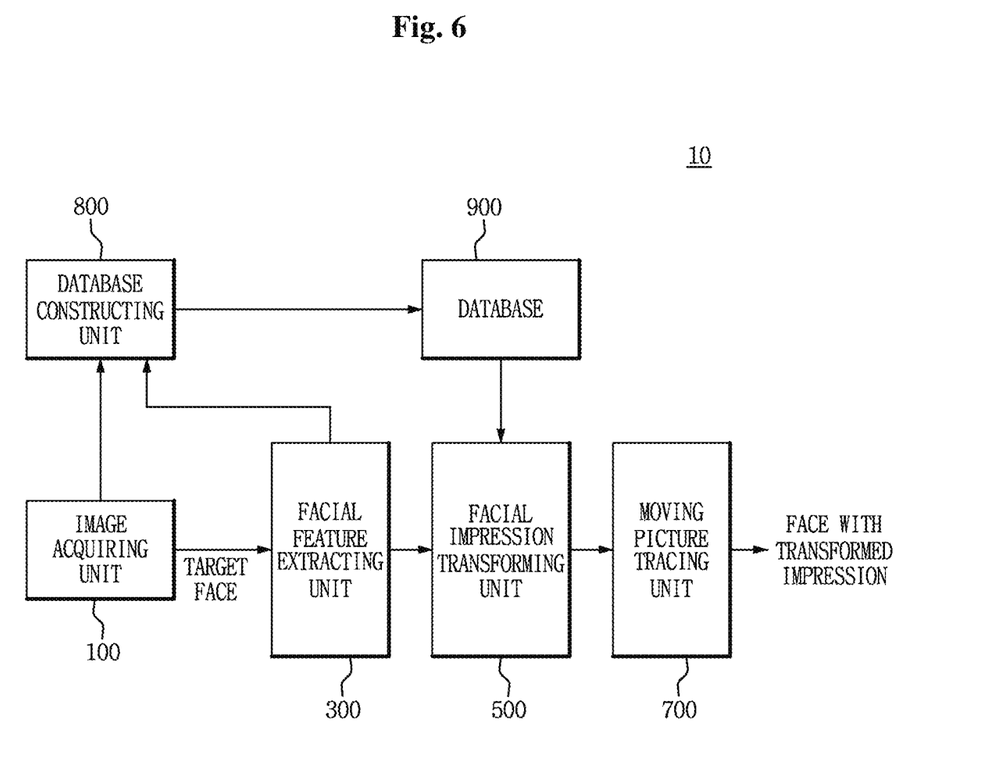
FIG. 6 is a block diagram showing a device for automatic facial impression transformation according to an embodiment of the present disclosure.
Figure 7:
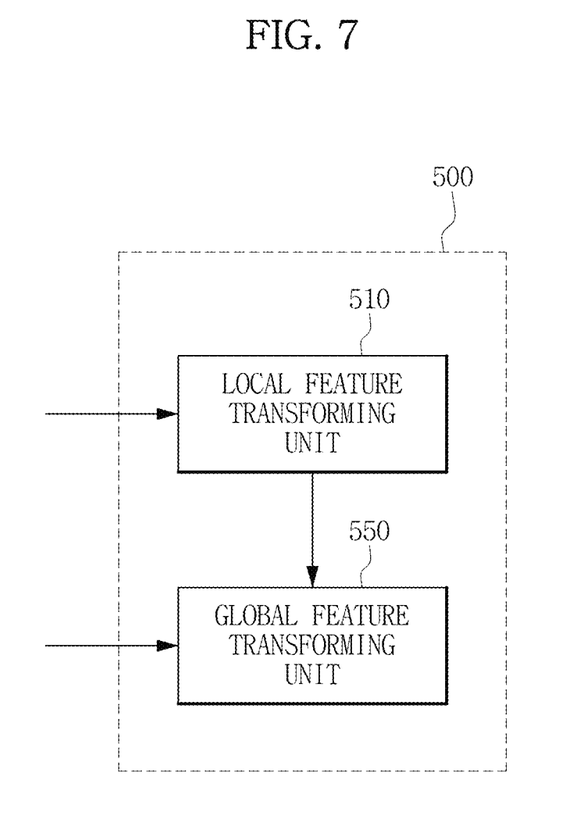
FIG. 7 is a block diagram showing a facial impression transforming unit, depicted in FIG. 6.

FIG. 6 is a block diagram showing a device for automatic facial impression transformation according to an embodiment of the present disclosure. FIG. 7 is a block diagram showing a facial impression transforming unit, depicted in FIG. 6.

The device 10 for automatic facial impression transformation (hereinafter, also referred to as a device) according to the present disclosure transforms a target face model into a desired facial impression for a video conference. The facial impression transformation is based on learning data and automatically transforms an overall facial impression in consideration of an identity of a corresponding person while keeping similarity to an original photograph. In addition, the facial impression is transformed into a facial impression desired by the user according to a target face model, and a target face is exhibited in real time as being substituted with a facial impression transformed as desired by the user.

Referring to FIG. 6, the device 10 according to the present disclosure includes a facial feature extracting unit 300, a facial impression transforming unit 500 and a moving picture tracing unit 700.

Software (or, an application) for performing automatic facial impression transformation may be installed and executed at the device 10 of the present disclosure, and components such as the facial feature extracting unit 300, the facial impression transforming unit 500 and the moving picture tracing unit 700 may be controlled by software for performing the automatic facial impression transformation, executed at the device 10.

The device 10 may be a separate terminal or a partial module of a terminal. In addition, the components such as the facial feature extracting unit 300, the facial impression transforming unit 500 and the moving picture tracing unit 700 may be configured as an integrated module or as at least one module. However, the components may also be configured as separate modules, on the contrary to the above.

The device 10 may be movable or stationary. The device 10 may be in the form of a server or an engine and may also be called with other terms such as a device, an apparatus, a terminal, a user equipment (UE), a mobile station (MS), a wireless device, a handheld device or the like.

The device 10 may execute or produce various kinds of software on the basis of an operation system (OS), namely a system. The operation system is a system program for allowing software to use hardware of a device and may employ all kinds of mobile computer operation systems such as Android OS, iOS, Windows mobile OS, Bada OS, Symbian OS, Blackberry OS or the like and all kinds of computer operation systems such as Windows series, Linux series, Unix series, MAC, AIX, HP-UX or the like.

Referring to FIG. 6, the device 10 may further include an image acquiring unit 100 for acquiring a target face whose facial impression is to be transformed, and a database constructing unit 800 for storing expressionless front facial images as well as landmark points and distance vectors extracted from the expressionless front facial images.

The image acquiring unit 100 may acquire expressionless front image data. The image acquiring unit 100 may acquire an image of a target face but also acquire expressionless front facial images for learning.

The database constructing unit 800 generates a mesh where landmark points for face elements (eyebrows, eyes, nose and mouth) and landmark points selected by means of Delaunay triangulation are connected, and stores distance vectors respectively representing distances of the landmark points in a database 900.

In addition, for learning, each data is evaluated into scores (for example, 1 to 7 points) depending on the degree of facial impression to be transformed. In an embodiment, a user may input a score for a facial impression, for example "baby-faced", "matured", "sharp", "gentle" or the like, and the score of the facial impression may be automatically calculated according to the input score and stored in the database 900.

The facial feature extracting unit 300 extracts landmark points of elements of a target face whose facial impression is to be transformed, and distance vectors respectively representing the landmark points.

The facial impression transforming unit 500 compares the distance vectors, selects an n (here, n is a natural number) number of learning data set from the database from a learning data most similar to the target face, extracts landmark points and distance vectors from the learning data set, and transforms the facial impression of the target face based on the extracted landmark points and distance vectors of the learning data set.

Referring to FIG. 7, the facial impression transforming unit 500 includes a local feature transforming unit 510 for determining shapes and sizes of elements of the target face and a global feature transforming unit 550 for determining locations and angles of the elements of the target face.

The local feature transforming unit 510 generates a target function based on the landmark points of the learning data set and the score of the facial impression and determines shapes and sizes of the elements of the target face based on the target function.

The global feature transforming unit 550 generates a target function based on the distance vectors of the learning data set and the score of the facial impression and determines locations and angles of the elements of the target face based on the target function.

The facial impression transformation of the present disclosure may output a resultant image with a maximized transformation effect by using two stages of local transformation and global transformation. Meanwhile, two stages may also be modified individually, and it is also possible to acquire a resultant image where a facial impression is transformed in consideration of only global features or a resultant image where a facial impression is transformed in consideration of only local features.

In addition, in the present disclosure, facial impression transformation may be performed for various facial impressions based on learning, and the image with a transformed facial impression may be utilized to treat not only a still image but also a moving image.

The moving picture tracing unit 700 outputs a transformed image in real time with respect to a moving target face. For this, angles and locations of the result image of the facial impression transformation, namely the landmark points of the finally transformed target face, are arranged to landmark points of an initial face before transformation.

For a moving facial image, landmark points of the face are extracted in real time for each frame by means of a facial feature extracting technique. A difference value between the landmark points of the face extracted in real time and the landmark points of the initial face before transformation is obtained, and then the obtained value is added to the landmark points of the transformed face in real time.

An actual texture image of each frame input by a camera is warped based on the landmark points changing in real time and then output.

In the present disclosure, the facial impression transformation is based on learning data and automatically transforms an overall facial impression in consideration of an identity of a corresponding person while keeping a face shape of the user. In addition, in the present disclosure, both local changes and global changes of the face are considered, and the facial impression may be transformed in various ways as selected by the user. Further, based on the transformed facial image, the facial impression transformation may also be performed to a moving picture.

While the exemplary embodiments have been shown and described, it will be understood by those skilled in the art that various changes in form and details may be made thereto without departing from the spirit and scope of this disclosure as defined by the appended claims.

In an existing mobile market, users of mobile videos and video calls are greatly increasing due to the propagation of LTE. In addition, as it is expected that smart TV is widely supplied, video conferences and remote meetings using large TV will be more demanded, and visual communications will be also more demanded along with the appearance of smart phones. In addition, as various communications for video calls such as Skype and Hangout appear, real-time facial impression transformation is demanded, and thus the present disclosure is expected to have a ripple effect.

Moreover, the present disclosure is expected to be actively utilized in an emotional image processing technique (a facial impression transformation technique in an image) for image making in social media. In addition, since the present disclosure may be easily associated with various realistic contents and social media services, the present disclosure is expected to be utilized for various image-based or video-based applications such as cosmetic surgery, moving pictures, mobile communications or the like. Further, the present disclosure is expected to be applicable to various real-time moving picture processing techniques (facial impression transformation) in a mobile video market.

What is claimed is:

1. A method for automatic facial impression transformation, comprising:
   extracting landmark points for elements of a target face whose facial impression is to be transformed as well as distance vectors respectively representing distances of the landmark points;
   selecting a learning data set similar to the target face from a database by comparing the distance vectors;
   extracting landmark points and distance vectors from the learning data set;
   transforming a local feature of the target face based on the landmark points of the learning data set and score data for a facial impression; and
   transforming a global feature of the target face based on the distance vectors of the learning data set and the score data for the facial impression,
   wherein the learning data set used is the same for the transforming of the local feature of the target face and the transforming of the global feature of the target face.

2. The method for automatic facial impression transformation according to claim 1,
   wherein in the selecting a learning data set similar to the target face from a database by comparing the distance vectors, an n, where n is a natural number, number of learning data set are selected in order from a learning data most similar to the target face.

3. The method for automatic facial impression transformation according to claim 1, wherein the transforming of a local feature of the target face based on the landmark points of the learning data set includes:
   generating a target function based on the landmark points of the learning data set and score data of a facial impression; and
   determining shapes and sizes of the elements of the target face based on the target function.

4. The method for automatic facial impression transformation according to claim 1, wherein the transforming of a global feature of the target face based on the distance vectors of the learning data set includes:
   generating a target function based on the distance vectors of the learning data set and score data of a facial impression; and
   determining locations and angles of the elements of the target face based on the target function.

5. The method for automatic facial impression transformation according to claim 4,
   wherein the determining of locations and angles of the elements of the target face based on the target function includes:
   extracting a modified distance vector based on the target function;

extracting a modified distance vector for a specific facial impression by means of an optimization technique;
extracting a modified distance vector by setting a distance vector of the target face as an initial value at the target function;
modifying landmark points to decrease an error of distance between the modified distance vector and the landmark points corresponding to the modified distance vector; and
moving locations of the face elements transformed based on the modified landmark points.

6. The method for automatic facial impression transformation according to claim 1, further comprising:
outputting an image transformed in real time with respect to a moving target face.

7. The method for automatic facial impression transformation according to claim 6, wherein the outputting of an image transformed in real time with respect to a moving target face includes:
arranging angles and locations of the landmark points of the transformed target face to landmark points of an initial face before transformation;
extracting landmark points of the moving target face in real time for each frame with respect to a moving facial image;
extracting an angle difference between the landmark points extracted in real time and the landmark points of the initial face;
adding the angle difference to the landmark points of the transformed target face; and
warping the moving target face based on the landmark points modified in real time and outputting the warped face.

8. The method for automatic facial impression transformation according to claim 1, further comprising:
acquiring a target face whose facial impression is to be transformed.

9. The method for automatic facial impression transformation according to claim 8,
wherein the target face is an expressionless photograph staring at front.

10. The method for automatic facial impression transformation according to claim 1, further comprising:
forming a database storing learning data.

11. The method for automatic facial impression transformation according to claim 10,
wherein the forming of a database storing learning data includes:
acquiring expressionless front facial images; and
extracting landmark points and distance vectors from the expressionless front facial images.

12. The method for automatic facial impression transformation according to claim 10, wherein the forming of a database storing learning data includes:
collecting and accumulating score data for facial impressions.

13. The method for automatic facial impression transformation according to claim 1, wherein the score data is a value of a visual characteristic of each face of the learning data.

14. A non-transitory computer-readable recording medium, on which a computer program for executing the method for automatic facial impression transformation according to claim 1 is recorded.

15. A device for automatic facial impression transformation, comprising:
a facial feature extracting unit configured to extract landmark points for elements of a target face whose facial impression is to be transformed as well as distance vectors respectively representing distances of the landmark points;
a facial impression transforming unit configured to select an n, where n is a natural number, number of learning data set in order from a learning data most similar to the target face by comparing the distance vectors, extract landmark points and distance vectors from the learning data set, and transform a facial impression of the target face based on the extracted landmark points and distance vectors of the learning data set; and
a moving picture tracing unit configured to output a transformed image in real time with respect to a moving target face using the transformed facial impression of the target face,
wherein the same learning data set is used for the transformation of local features and the transformation of global features of the target face.

16. The device for automatic facial impression transformation according to claim 15,
wherein the facial impression transforming unit includes a local feature transforming unit configured to generate a target function based on the landmark points of the learning data set and score data of a facial impression and determine shapes and sizes of the elements of the target face based on the target function.

17. The device for automatic facial impression transformation according to claim 15,
wherein the facial impression transforming unit includes a global feature transforming unit configured to generate a target function based on the distance vectors of the learning data set and score data of a facial impression and determine locations and angles of the elements of the target face based on the target function.

18. The device for automatic facial impression transformation according to claim 15, further comprising:
an image acquiring unit configured to acquire a target face whose facial impression is to be transformed.

19. The device for automatic facial impression transformation according to claim 15, further comprising:
a database constructing unit configured to store expressionless front facial images as well as landmark points and distance vectors extracted from the expressionless front facial images.

* * * * *